United States Patent [19]
McLochlin

[11] Patent Number: 5,812,609
[45] Date of Patent: Sep. 22, 1998

[54] COMMUNICATION INTERCEPT DEVICE USING DIGITAL DROP RECEIVERS IN MULTIPLE TIERS

[75] Inventor: Charles David McLochlin, Laurel, Md.

[73] Assignee: The United States of America as represented by the Secretary of the National Security Agency, Washington, D.C.

[21] Appl. No.: 674,479

[22] Filed: Jul. 2, 1996

[51] Int. Cl.⁶ .............................. H04L 27/14; H04L 27/06
[52] U.S. Cl. ...................... 375/340; 375/316; 375/377; 455/410
[58] Field of Search ..................................... 375/340, 316, 375/377; 370/480, 497, 343, 344; 364/724.011, 724.1; 455/130, 150.1, 161.2, 339, 410, 434

[56] References Cited

U.S. PATENT DOCUMENTS 5,570,392 10/1996 Young et al. ............................ 375/308
5,590,156 12/1996 Carney .................................... 375/316

*Primary Examiner*—Stephen Chin
*Assistant Examiner*—Betsy L. Deppe
*Attorney, Agent, or Firm*—Robert D. Morelli

[57] ABSTRACT

A communications intercept device that includes an analog-to-digital converter for digitizing an analog wideband input signal, a first memory for storing the digitized wideband signal, a first digital drop receiver in a first tier for selecting signals stored in the first memory, a controller for controlling which signals are selected, a second memory for storing the signals selected by the first digital drop receiver, and a second digital drop receiver in a second tier for selecting signals stored in the second memory under control of the controller.

16 Claims, 3 Drawing Sheets

COMMUNICATION INTERCEPT DEVICE USING DIGITAL DROP RECEIVERS IN MULTIPLE TIERS

FIELD OF THE INVENTION

The present invention relates, in general, to communication and, in particular, to a communications intercept device using digital drop receivers in multiple tiers.

BACKGROUND OF THE INVENTION

Eugene Hogenauer, in a paper entitled "An Economical Class of Digital Filters for Decimation and Interpolation," *IEEE Transactions On Acoustics, Speech, And Signal Processing*, Vol. ASSP-29, No. 2, April 1981, set the stage for the development of the digital drop receiver by disclosing a device for and method of realizing a digital linear phase finite impulse response (FIR) filter for decimation (sampling rate decrease) and interpolation (sampling rate increase) that does not require multipliers and large amounts of storage. The result is an economical hardware implementation of a digital filter. A digital drop receiver is used to filter, or drop, a narrowband signal out of a wideband signal.

David Chester, Callie Riley, David Damerow, and Clay Olmstead, in a paper entitled "VLSI Implementation of a Wide Band, High Dynamic Range Digital Drop Receiver," *IEEE*, 1991, disclosed an implementation of a single digital drop receiver using two types of integrated circuits. The first integrated circuit type is a numerically controlled oscillator/modulator. One numerically controlled oscillator/modulator is used in conjunction with two integrated circuits of the second type to implement a single digital drop receiver. The numerically controlled oscillator/modulator is commercially available from Harris Corporation as part number "HSP45116." The second integrated circuit type is a decimating digital filter. Two decimating digital filters are used with the one numerically controlled oscillator/modulator to implement a single digital drop receiver. The decimating digital filter is also available from Harris Corporation as part number "HSP43220." A 16-bit real or 32-bit complex signal is input into the numerically controlled oscillator/modulator. The numerically controlled oscillator/modulator performs a tunable complex down conversion on the input signal and outputs a real portion and an imaginary portion. Each portion is connected to one of the decimating digital filters. Each decimating digital filter low pass filters the input. The result is a single digital drop receiver for extracting a narrowband signal from a wideband signal.

Applications of a digital drop receiver include digital radios, channelized radiometry, zoom spectral analysis, frequency-division-multiplexing (FDM) to time-division-multiplexing (TDM) conversion, narrowband channelization, channelized receivers, etc.

Matthew Salatino and Ronald Bracken, in a paper entitled "Die and MCM Test Strategy: The Key to MCM Manufacturability," IEMT Symposium, *IEEE*, 1991, disclose the use of four digital drop receivers configured in one tier to realize a four-channel channelized receiver. The channelized receiver essentially consists of an input for receiving a wideband radio frequency (RF) signal, an analog wideband RF tuner for selecting a signal band of interest, an analog-to-digital (A/D) converter for converting the analog signal of interest into a digital signal, four digital drop receivers configured in parallel in a single tier for receiving the digital signal, and an output for outputting up to four narrowband signals selected from the signal band.

U.S. Pat. No. 5,428,667, entitled "MULTI-CHANNEL CELLULAR COMMUNICATIONS INTERCEPT SYSTEM," discloses a single tier of receivers for receiving a wideband signal and channelizing it into various narrowband signals of interest. U.S. Pat. No. 5,428,667 discloses the technique of using a single digital drop receiver for each narrowband signal of interest. Since digital drop receivers are relatively expensive, only those with substantial funds (e.g., governments, phone companies, radio stations, etc.) may employ such a scheme. For the commercial consumer, a single digital drop receiver is used to select one narrowband signal of interest or multiplex various narrowband signals of interest. In this scheme, performance suffers because only one narrowband signal may be monitored at any one time. Therefore, there is a need for a high performance receiver (i.e., one that may be used to monitor many narrowband signals of interest without missing one) that is not prohibitively expensive (i.e., does not require a digital drop receiver for each narrowband signal of interest). The present invention offers such a device.

SUMMARY OF THE INVENTION

It is an object of the present invention to intercept a wideband signal and select therefrom a plurality of narrowband signals in a manner that does not require a digital drop receiver per narrowband signal.

It is another object of the present invention to intercept a wideband signal and select therefrom a plurality of narrowband signals using at least one digital drop receiver in each of a plurality of tiers.

The present invention is a device for intercepting a wideband communication signal and selecting therefrom all narrowband signals of interest in a high-performance and economic manner. The wideband communication signal includes a plurality of voice grade channels (i.e., a plurality of 8 KHz sampled signals). A digital drop receiver may be used to select a narrowband (e.g., a single 8 KHz sampled voice grade channel) from a wideband signal. For high-performance devices, a digital drop receiver is used per voice grade channel of interest. Such a scheme is prohibitively expensive for commercial consumers. Commercial consumers have been forced by economics to get by with devices containing a single digital drop receiver or a device that contains a limited number of digital drop receivers configured in parallel in a single tier. The result has been that commercial users could only monitor one voice grade channel at a time or a limited number of voice grade channels in a multiplex fashion.

The present invention discloses a device that uses a plurality of digital drop receivers in a configuration using a plurality of tiers. The result is a high-performance receiver that uses fewer digital drop receivers than one per voice grade channel but allows the monitoring of all narrowband signals of interest in a multiplex fashion. Therefore, the high-performance device of the present invention would not be prohibitively expensive for a commercial consumer.

In the preferred embodiment, the present invention includes an input for receiving an analog wideband communication signal containing a plurality of voice grade channels. The wideband signal is then processed by an analog-to-digital converter (A/D) to convert the analog wideband signal into a digital signal. The output of the A/D converter is connected to a first memory device for storing the digitized wideband signal. The first memory device is connected to a first digital drop receiver. A controller is connected to the first digital drop receiver. The first digital drop receiver is used to process the stored digitized wideband signal a plurality of times for selecting a plurality of mediumband signals of interest in multiplex fashion under control of the controller. Each output of the first digital drop receiver is a mediumband signal containing a plurality of voice grade channels. Each output of the first digital drop receiver is stored in a second memory device. The output of the second memory device is connected to a second digital drop receiver in a second tier. The controller that controls the first digital drop receiver in the first tier is also connected to the second digital drop receiver in the second tier. The second digital drop receiver scans the contents of the second memory (i.e., the mediumband signals selected by the first digital drop receiver) and selects therefrom various narrowband signals under control of the controller.

The resulting device is a relatively inexpensive receiver that may be used to select, in multiplex fashion, all narrowband signals of interest from a wideband signal using only two digital drop receivers in a two tier configuration. For example, a prior art scheme for selecting 250 voice grade channels (i.e., 250 8 KHz sampled channels) out of a wideband signal may be constructed using an A/D converter operating at less than or equal to 2.5 MHz and 250 digital drop receivers connected in parallel in a single tier. In the preferred embodiment, a wideband signal is digitized by an A/D converter operating at less than or equal to 25 MHz. The A/D converter is connected to a first memory which stores the digitized wideband signal. A digital drop receiver is connected to the memory for selecting various wideband signals in a multiplexed fashion under control of a controller. The output of the first digital drop receiver is connected to a second memory for storing the mediumband signals of interest. A second digital drop receiver in a second tier is connected to the second memory for selecting various narrowband signals of interest in multiplex fashion under control of the controller. The resulting device is one that uses only two digital drop receivers to select all narrowband signals of interest in multiplex fashion from a wideband signal. Such a device has more delay than one that uses 250 digital drop receivers, but is more economical. Running the device at a higher clock frequency will improve its performance.

The processing time of the preferred embodiment may be improved in an alternate embodiment by including a plurality of digital drop receivers in a plurality of tiers. For example, the alternate embodiment may include an input for receiving an analog wideband communication signal containing a plurality of voice grade channels. The wideband signal may then be processed by an analog-to-digital converter (A/D) to convert the analog wideband signal into a digital signal. The output of the A/D converter may be connected to a plurality of digital drop receivers connected in parallel in a first tier. Each digital drop receiver in the first tier may select a mediumband signal containing a plurality of voice grade channels under control of a controller. The outputs of the first tier of digital drop receivers are stored in a memory device. The output of the memory device is connected to the inputs of a plurality of digital drop receivers in a second tier. The controller that controls the first tier of digital drop receivers also controls the second tier of digital drop receivers. Each digital drop receiver in the second tier scans the contents of the memory (i.e., the mediumband signals selected by the first tier of digital drop receivers) and selects therefrom various less-wide (e.g., narrowband) signals. At this point, performance is improved because fewer scans of the memory are required by more than two digital drop receivers than is required by the two digital drop receivers of the preferred embodiment. Additional tiers may, or may not, be added to the alternate embodiment.

The alternate embodiment may be made to run faster by adding more digital drop receivers in parallel in each tier. A hardware gain is maintained over the prior art as long as less than one digital drop receiver is required for each narrowband signal of interest. For example, a prior art device may use a 2.5 MHz A/D converter to convert a wideband signal containing 250 voice grade channels (e.g., 250 4 KHz-wide channels) into a digital signal. Two-hundred fifty digital drop receivers would then be required to select these voice grade channels. In the alternate embodiment of the present invention, a 25 MHz A/D converter may be connected to a first tier of five digital drop receivers. Each of the first tier digital drop receivers, under control of a controller, selects fifty voice grade channels from the digitized signal in parallel fashion. All 250 voice grade channels are then stored in a memory. The memory is then processed by a second tier of five digital drop receivers. Each of the second tier digital drop receivers, under control of the controller, selects 50 narrowband signals out of the memory in multiplex fashion. The result is a device that may select 250 voice grade channels using 10 digital drop receivers. The device has more delay than one that uses 250 digital drop receivers, but the device is more economical. Other configurations (i.e., the number of digital drop receivers per tier and the number of tiers) are possible.

DETAILED DESCRIPTION

Figure 1:
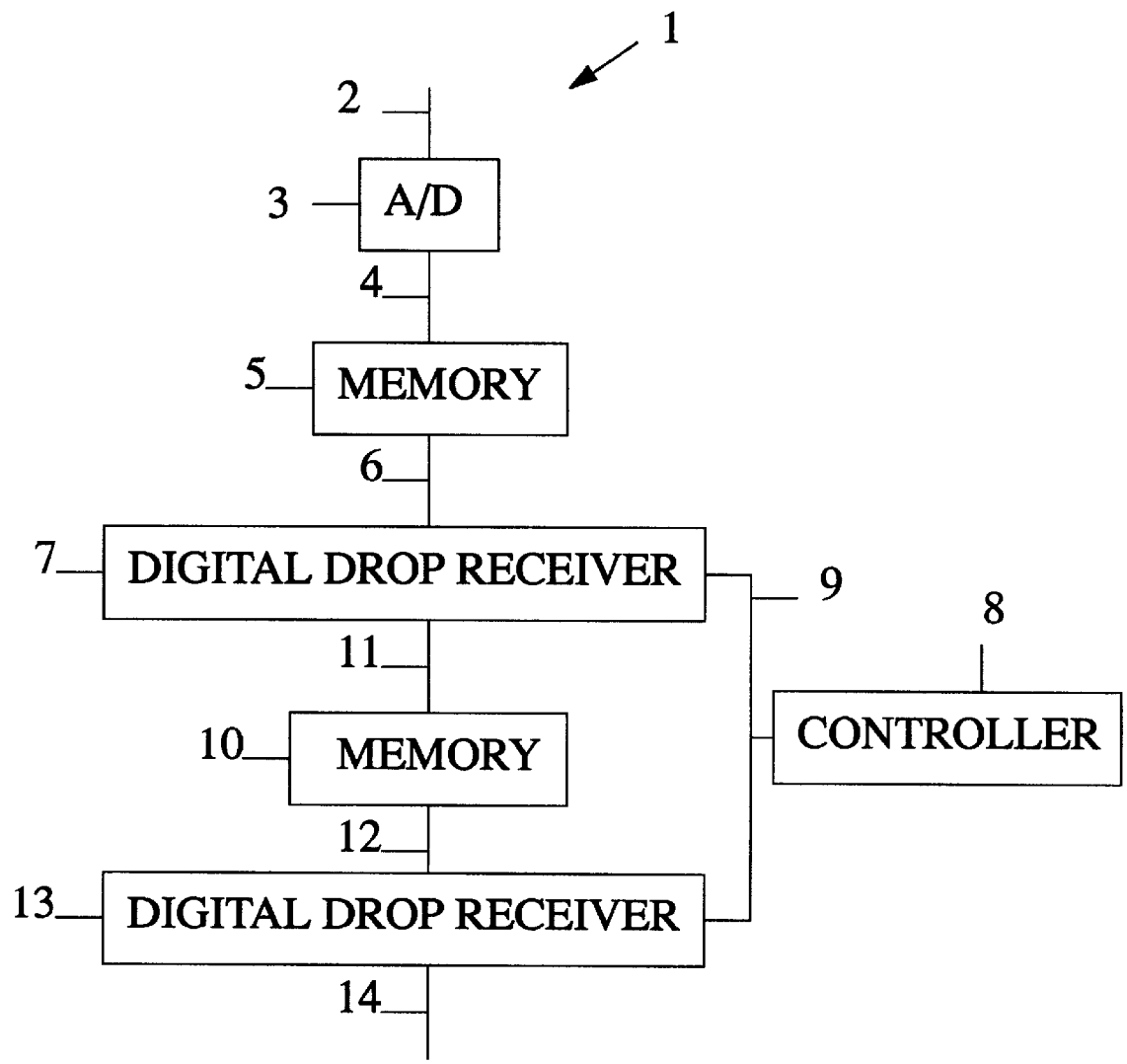
FIG. 1 is a block diagram of the present invention.

The present invention as illustrated in FIG. 1 is a device 1 for intercepting an analog wideband communication signal and selecting therefrom all narrowband signals of interest in a high-performance and economic manner. The analog wideband communication signal, which includes a plurality of voice grade channels (i.e., a plurality of 4 KHz-wide signals), is connected to the present invention 1 via an input 2. The analog wideband signal is transmitted along the input 2 to an analog-to-digital (A/D) converter 3. The A/D converter 3 converts the analog wideband signal into a digital wideband signal.

The output 4 of the A/D converter is connected to a first memory device 5. The memory device 5 stores the digitized wideband signal. The output 6 of the memory device 5 is connected to a first digital drop receiver 7.

A digital drop receiver is typically used to select a narrowband (e.g., a single 8 KHz sampled voice grade channel) from a wideband signal. For high-performance devices, a digital drop receiver is used per voice grade channel of interest. Such a scheme is prohibitively expensive for commercial consumers. Commercial consumers have been forced by economics to get by with devices containing a single digital drop receiver or a device that contains a limited number of digital drop receivers configured in parallel in a single tier. The result has been that commercial users could only monitor one voice grade channel at a time or a limited number of voice grade channels in a multiplex fashion.

A controller 8 is used to control the first digital drop receiver 7. The output 9 of the controller 8 is connected to the first digital drop receiver 7. The controller 8 controls what frequencies of the digitized wideband signal stored in the first memory 5 are selected in multiplex fashion. The first digital drop receiver 7 processes the stored digitized wideband signal a plurality of times under control of the controller 8 for selecting a plurality of mediumband signals of interest. Each output of the first digital drop receiver 7 is a mediumband signal containing a plurality of voice grade channels. Each output of the first digital drop receiver 7 is stored in a second memory device 10. The mediumband signals selected by the first digital drop receiver 7 are then stored in the second memory 10 via the output 11 of the first digital drop receiver 7. The output 12 of the second memory 10 is connected via output 12 of the second memory 12 to a second digital drop receiver 13 in a second tier via. The controller 8 also controls the second digital drop receiver in the second tier. The output 9 of the controller 8 is connected to the second digital drop receiver 13. The second digital drop receiver 13 scans the contents of the second memory 10 (i.e., the mediumband signals selected by the first digital drop receiver 7) and selects therefrom various narrowband signals under control of the controller 8. The narrowband signals selected appear in multiplex fashion at the output 14 of the second digital drop receiver 13 in the second tier.

The resulting device 1 is a relatively inexpensive receiver that may be used to select, in multiplex fashion, all narrowband signals of interest from a wideband signal using only two digital drop receivers in a two tier configuration. For example, a prior art scheme for selecting 250 voice grade channels (i.e., 250 8 KHz sampled channels) out of a wideband signal may be constructed using a 2.5 MHz A/D converter and 250 digital drop receivers connected in parallel in a single tier.

In the preferred embodiment of FIG. 1, the wideband signal may be digitized by a 25 MHz A/D converter. The first memory 5 and the second memory 10 may be commercial memories of sufficient size to store the signals of interest, which stores the digitized wideband signal. The first digital drop receiver 7 and the second digital drop receiver 13 may be constructed using Harris Corporations numerically controlled oscillator/modulator (i.e., part number "HSP45116") and two of Harris's decimating digital filters (i.e., part number "HSP43220"). The controller 8 may be realized using a finite state machine or a general purpose microprocessor.

Figure 1A:
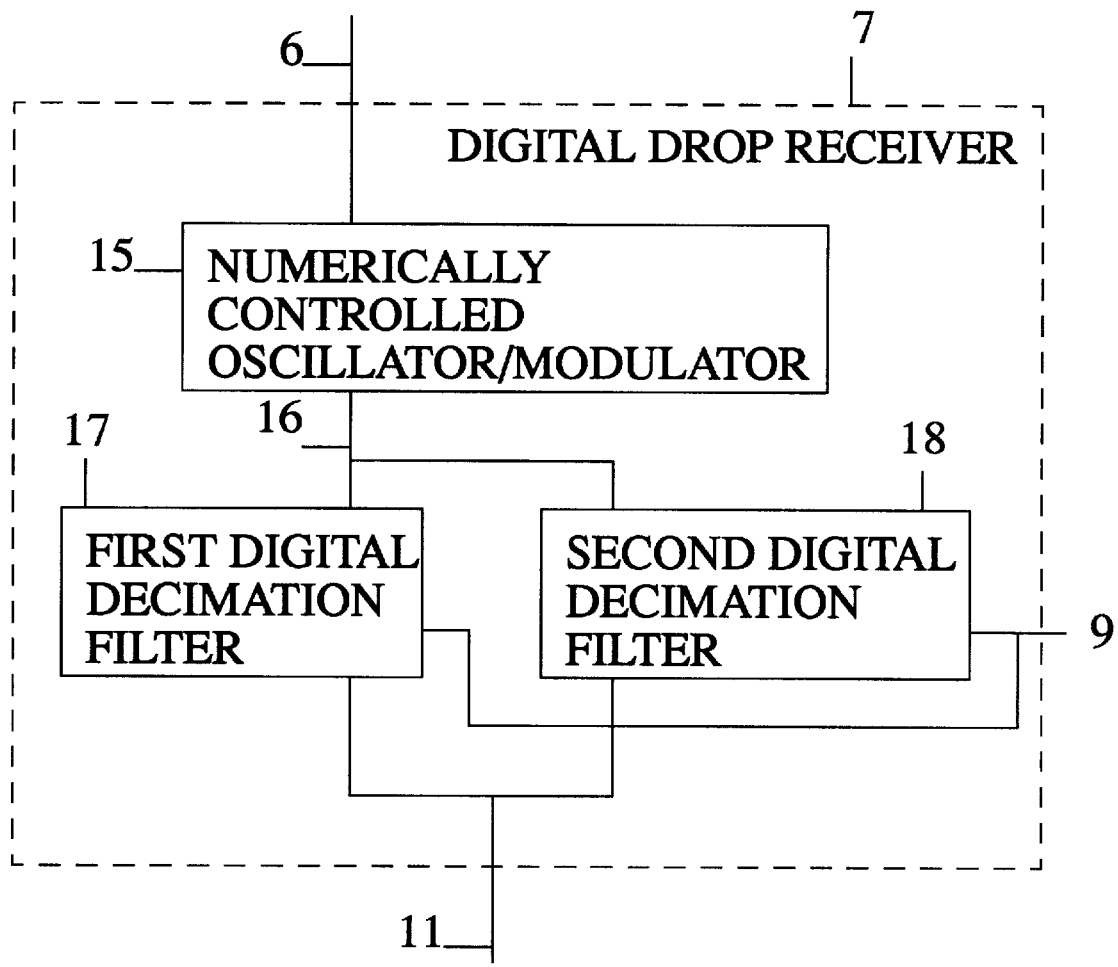
FIG. 1A is a block diagram of a digital drop receiver.

FIG. 1A is a block diagram of each digital drop receiver used in the present invention. For convenience, the block diagram of FIG. 1A is described below in relation to the digital drop receiver 7 of FIG. 1. The following description may be modified easily to describe the other digital drop receivers used in the present invention. The input 6 of the digital drop receiver 7 in FIG. 1 is connected to a numerically controlled oscillator/modulator 15 in FIG. 1A. The output 16 of the numerically controlled oscillator/modulator 15 is connected to a first digital decimation filter 17 and a second digital decimation filter 18. The input 9 of the digital drop receiver 7 in FIG. 1 is connected to the first digital decimation filter 17 in FIG. 1A and the second digital decimation filter 18. The outputs of the first digital decimation filter 17 and the second digital decimation filter 18 are connected to the output 11 of the digital drop receiver 7 of FIG. 1.

The resulting device is one that uses only two digital drop receivers to select all narrowband signals of interest in multiplex fashion from a wideband signal. Such a device has more delay than one that uses 250 digital drop receivers in parallel fashion in a single tier, but the present invention is more economical. Running the present invention at a higher clock frequency will improve its performance.

Figure 2:
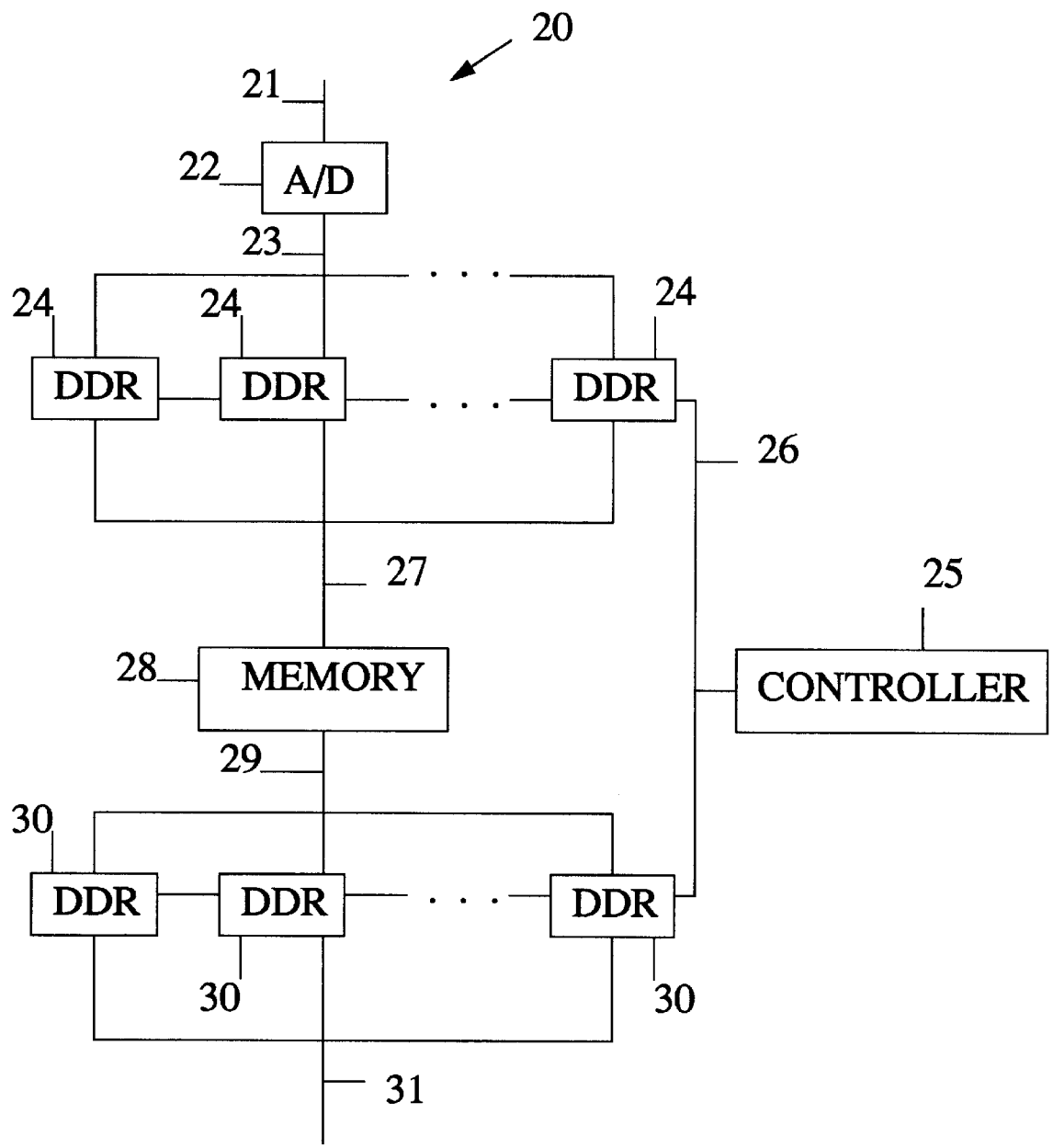
FIG. 2 is a block diagram of an alternate embodiment of the present invention.

The processing time of the preferred embodiment may be improved in an alternate embodiment 20 as illustrated in FIG. 2 by including a plurality of digital drop receivers in a plurality of tiers. For example, the alternate embodiment 20 may include an input 21 for receiving an analog wideband communication signal containing a plurality of voice grade channels. The input 21 is connected to an A/D converter 22 for converting the analog wideband signal into a digital signal. The output 23 of the A/D converter 22 may be connected to a plurality of digital drop receivers 24 which are connected in parallel in a first tier. Each digital drop receiver 24 in the first tier may select a mediumband signal containing a plurality of voice grade channels from the digitized wideband signal under control of a controller 25. The output 26 of the controller 25 is connected to each digital drop receiver 24 in the first tier. The outputs 27 of the first tier of digital drop receivers 24 are connected to a memory 28. Mediumband signals selected from the digitized wideband signal is stored in the memory 28. The output 29 of the memory device 28 is connected to a plurality of digital drop receivers 30 in a second tier. The controller 25 also controls the second tier of digital drop receivers 30. That is, the output 26 of the controller 25 is connected to each of the digital drop receivers 30 in the second tier. Each digital drop receiver 30 in the second tier scans the contents of the memory 28 (i.e., the mediumband signals selected by the first tier of digital drop receivers 24) and selects therefrom various less-wide (e.g., narrowband) signals. The selected narrowband signals appear at the outputs 31 of the digital drop receivers 30 of the second tier. At this point, performance is improved over the device 1 of FIG. 1 because the required number of scans of the memory is reduced by the addition of more digital drop receivers. Additional tiers may, or may not, be added to the alternate embodiment 20.

The alternate embodiment 20 may be made to run faster by adding more digital drop receivers in parallel in each tier. A hardware gain is maintained over the prior art as long as less than one digital drop receiver is required for each narrowband signal of interest. For example, a prior art device may use a 2.5 MHz A/D converter to convert a wideband signal containing 250 voice grade channels (e.g., 250 4 KHz-wide channels) into a digital signal. Two-hundred fifty digital drop receivers would then be required to select these voice grade channels. In the alternate embodiment 20 of the present invention, a 25 MHz A/D converter may be connected to a first tier of five digital drop receivers. Each digital drop receiver may be constructed using Harris Corporation's numerically controlled oscillator/modulator (i.e., part number "HSP45116") and two of Harris's decimating digital filters (i.e., part number "HSP43220"). Each of the first tier digital drop receivers, under control of a controller, selects fifty voice grade channels from the digitized signal in parallel fashion. The controller may be realized with a finite state machine or a general purpose microprocessor. All 250 voice grade channels are then stored in a commercial memory of sufficient size to store the signals of interest. The memory is then processed by a second tier of five digital drop receivers. Each of the second tier digital drop receivers, under control of the controller, selects 50 narrowband signals out of the memory in multiplex fashion. The result is a device that may select 250 voice grade channels using 10 digital drop receivers. The device has more delay than one that uses 250 digital drop receivers, but the device is more economical. Other configurations are possible. That is, the number of digital drop receivers per tier and the number of tiers may be adjusted to suit the user's needs.

What is claimed is:

1. A communications intercept device, comprising:

a) an analog-to-digital converter, having an input for receiving an analog wideband signal, and having an output for transmitting a digitized version of the analog wideband signal;

b) a first memory, having an input connected to the output of said analog-to-digital converter for storing the digitized wideband signal, and having an output;

c) a first digital drop receiver, having a first input connected to the output of said first memory for selecting signals stored in said first memory, having a second input for receiving a control signal to control what signals are selected from said first memory, and having an output;

d) a controller, having an output connected to the second input of said first digital drop receiver for transmitting the control signal to said first digital drop receiver;

e) a second memory, having an input connected to the output of said first digital drop receiver for storing the signals selected by said first digital drop receiver, and having an output; and f) a second digital drop receiver, having a first input connected to the output of said second memory for selecting signals stored in said second memory, having a second input connected to the output of said controller for receiving the control signal that controls what signals are selected from said second memory, and having an output at which appears the signals selected by said second digital drop receiver.

2. The device of claim 1, wherein said analog-to-digital converter is comprised of an analog-to-digital converter that may be operated at less than or equal to 25 MHz.

3. The device of claim 1, wherein said first memory and said second memory are each comprised of a commercial memory device of sufficient size to store signals of interest.

4. The device of claim 1, wherein said first digital drop receiver and said second digital drop receiver are each comprised of:

a) a numerically controlled oscillator/modulator, having at least one input, having a first output, and having a second output;

b) a first decimating digital filter, having an input connected to the first output of said numerically controlled oscillator/modulator; and c) a second decimating digital filter, having an input connected to the second output of said numerically controlled oscillator/modulator, and having an output.

5. The device of claim 1, wherein said controller is a device selected from the group consisting of a finite state machine and a general purpose microprocessor.

6. The device of claim 2, wherein said first memory and said second memory are each comprised of a commercial memory device of sufficient size to store signals of interest.

7. The device of claim 6, wherein said first digital drop receiver and said second digital drop receiver are each comprised of:

a) a numerically controlled oscillator/modulator, having at least one input, having a first output, and having a second output;

b) a first decimating digital filter, having an input connected to the first output of said numerically controlled oscillator/modulator; and c) a second decimating digital filter, having an input connected to the second output of said numerically controlled oscillator/modulator, and having an output.

8. The device of claim 7, wherein said controller is a device selected from the group consisting of a finite state machine and a general purpose microprocessor.

9. A communications intercept device, comprising:

a) an analog-to-digital converter, having an input for receiving an analog wideband signal, and having an output for transmitting a digitized version of the analog wideband signal;

b) a first plurality of digital drop receivers configured in parallel in a first tier, where each of said first plurality of digital drop receivers has a first input connected to the output of said analog-to-digital converter for selecting signals from the digitized wideband signal, where each of said first plurality of digital drop receivers has a second input for receiving a control signal to control what signals are selected from said analog-to-digital converter, and where each of said first plurality of digital drop receivers has an output;

c) a controller, having an output connected to the second input of each of said first plurality of digital drop receivers for transmitting the control signal to each of said first plurality of digital drop receivers;

d) a memory, having an input connected to the output of each of said first plurality of digital drop receivers for storing the signals selected by said first plurality of digital drop receivers, and having an output; and e) a second plurality of digital drop receivers configured in parallel in a second tier, where each of said second plurality of digital drop receivers has a first input connected to the output of said memory for selecting signals stored in said memory, where each of said second plurality of digital drop receivers has a second input connected to the output of said controller for receiving a control signal to control what signals are selected from said memory, and where each of said second plurality of digital drop receivers has an output at which appears the signals selected by said second plurality of digital drop receivers.

10. The device of claim 9, wherein said analog-to-digital converter is comprised of an analog-to-digital converter that may be operated at less than or equal to 25 MHz.

11. The device of claim 9, wherein said memory is comprised of a commercial memory device of sufficient size to store signals of interest.

12. The device of claim 9, wherein each of said first plurality of digital drop receivers and each of said second plurality of digital drop receivers is comprised of:

a) a numerically controlled oscillator/modulator, having at least one input, having a first output, and having a second output;

b) a first decimating digital filter, having an input connected to the first output of said numerically controlled oscillator/modulator; and c) a second decimating digital filter, having an input connected to the second output of said numerically controlled oscillator/modulator, and having an output.

13. The device of claim 9, wherein said controller is a device selected from the group consisting of a finite state machine and a general purpose microprocessor.

14. The device of claim 10, wherein said memory is comprised of a commercial memory device of sufficient size to store signals of interest.

15. The device of claim 14, wherein each of said first plurality of digital drop receivers and each of said second plurality of digital drop receivers is comprised of:
   a) a numerically controlled oscillator/modulator, having at least one input, having a first output, and having a second output;
   b) a first decimating digital filter, having an input connected to the first output of said numerically controlled oscillator/modulator; and
   c) a second decimating digital filter, having an input connected to the second output of said numerically controlled oscillator/modulator, and having an output.

16. The device of claim 15, wherein said controller is a device selected from the group consisting of a finite state machine and a general purpose microprocessor.

* * * * *